United States Patent [19]

Stockl

[11] 3,875,846
[45] Apr. 8, 1975

[54] DEVICE FOR CHAMFERING THE END FACES OF THE TEETH OF TOOTHED MEMBERS

[75] Inventor: Max Stockl, Munich, Germany

[73] Assignee: Carl Hurth, Maschinen und Zahnradfabrik, Munich, Germany Munich, Germany

[22] Filed: Oct. 31, 1973

[21] Appl. No.: 411,311

[30] Foreign Application Priority Data
Mar. 2, 1973   Germany............................ 2310595

[52] U.S. Cl. .................................................. 90/1.4
[51] Int. Cl. ............................................. B23f 19/10
[58] Field of Search ................. 90/1.4, 9, 1, 10

[56] References Cited
UNITED STATES PATENTS
1,279,278   9/1918   Cross..................................... 90/1.4
2,135,819   11/1938   Klix....................................... 90/1.4
2,758,512   8/1956   Christman............................. 90/1.4

Primary Examiner—Gil Weidenfeld
Attorney, Agent, or Firm—Woodhams, Blanchard and Flynn

[57] ABSTRACT

Device for chamfering the end faces of gear teeth. There is provided a rotatably mounted sleeve containing a pair of elongated cutting tools projecting respectively from each end of said sleeve. Said tools are accurately adjustable to control the extent of projection from said sleeve and the projecting ends of said tools are shaped according to the contour to be cut. The sleeve is mounted for rotation about an axis perpendicular to the axis of the workpiece to be cut and, where internal teeth are involved, arranged to cut opposite teeth simultaneously. Suitable gearing is provided for rotatably driving said sleeve, and thereby also said tools, from the spindle of the machine tool while the workpiece is held in a suitable positioned chuck.

6 Claims, 4 Drawing Figures

DEVICE FOR CHAMFERING THE END FACES OF THE TEETH OF TOOTHED MEMBERS

FIELD OF THE INVENTION

The invention relates to a device for chamfering the end faces of the teeth of toothed members with a rotating fingerlike cutting tool.

Toothed members as referred to herein include straight or helically toothed, internally or externally toothed spur gears or bevel gears or any other toothlike elements.

BACKGROUND OF THE INVENTION

It is already known to work the ends of gear teeth with a fingerlike cutting tool which has one or more blades corresponding to the chamfered tooth shape taken in the radial direction of the tooth. The chamfer in the direction of the tooth thickness is determined by having the cutter for this chamfer pass by the teeth in a corresponding manner, wherein the guide is controlled by a copying device, cam control or other known device. The known devices for chamfering the tooth ends operate with one single cutter. The basic purpose of the invention is to accelerate the operation of chamfering.

The basic purpose of the invention is attained with a device of the above-described type. Depending on the manner in which the chuck for the workpiece lies with respect to the tool spindle of the machine tool there are two advantageous variations for driving the sleeve, namely the driving of the apparatus by spur gearing or by bevel gearing.

Further advantages and characteristics of the invention can be taken from the following description.

BRIEF DESCRIPTION OF THE DRAWINGS

The invention will be described in connection with FIGS. 1 to 3, of which

DETAILED DESCRIPTION

Figure 4:
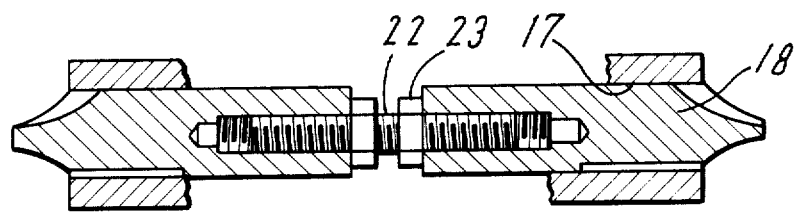
FIG. 4 is a central sectional view on an enlarged scale of the cutter of FIG. 2.
Figure 1:
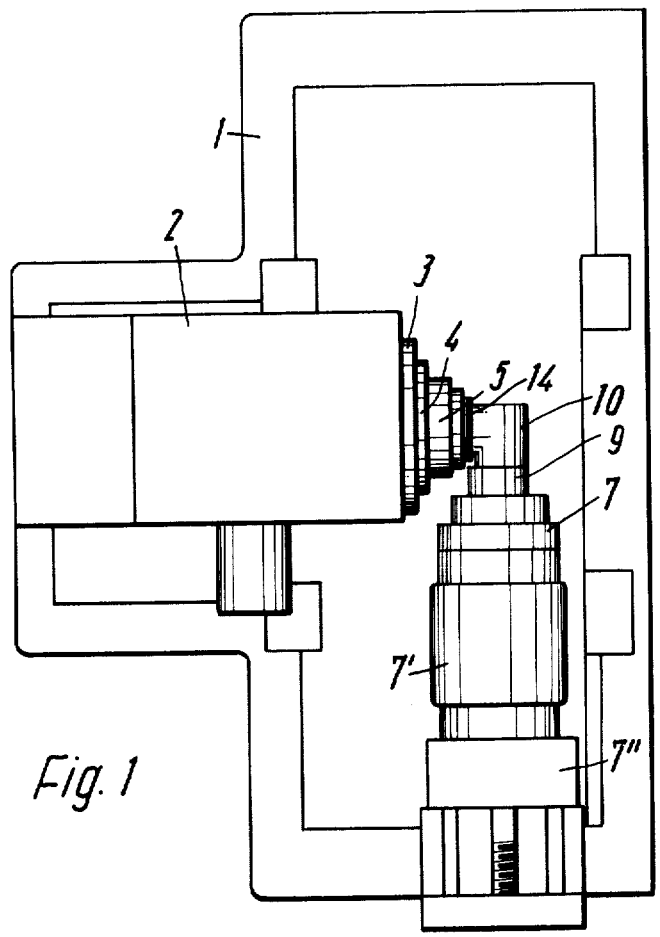
FIG. 1 illustrates a machine for chamfering the ends of gear teeth, to which machine the invention can be applied.

FIG. 1 is a top view of a conventional machine for chamfering the ends of gear teeth. A workpiece headstock 2 is supported on a machine frame 1, which headstock has all means for adjusting same axially of the workpiece spindle 3, for controlling the drive in order to rotate the workpiece spindle and for controlling a reciprocal movement of the workpiece spindle for effecting the chamfering of the teeth. The workpiece spindle carries on the face side a chuck 4 for the workpiece 5 which latter in the example is a spur gear with internal teeth. The teeth of the internal gear 6 are to be chamfered. The abovementioned means are known and need not be further illustrated or described.

Figure 2:
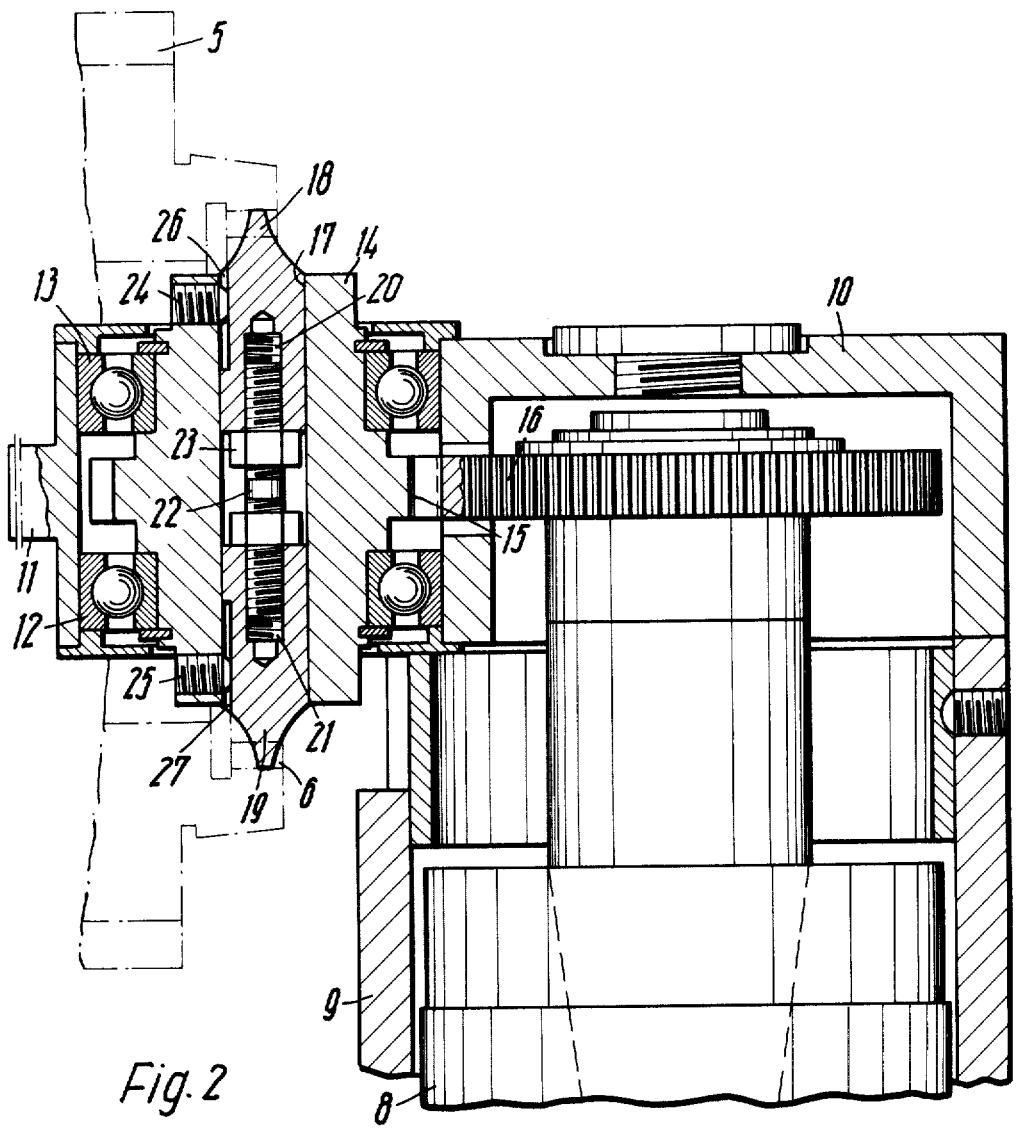
FIG. 2 illustrates an embodiment of the invention having spur gearing.
Figure 3:
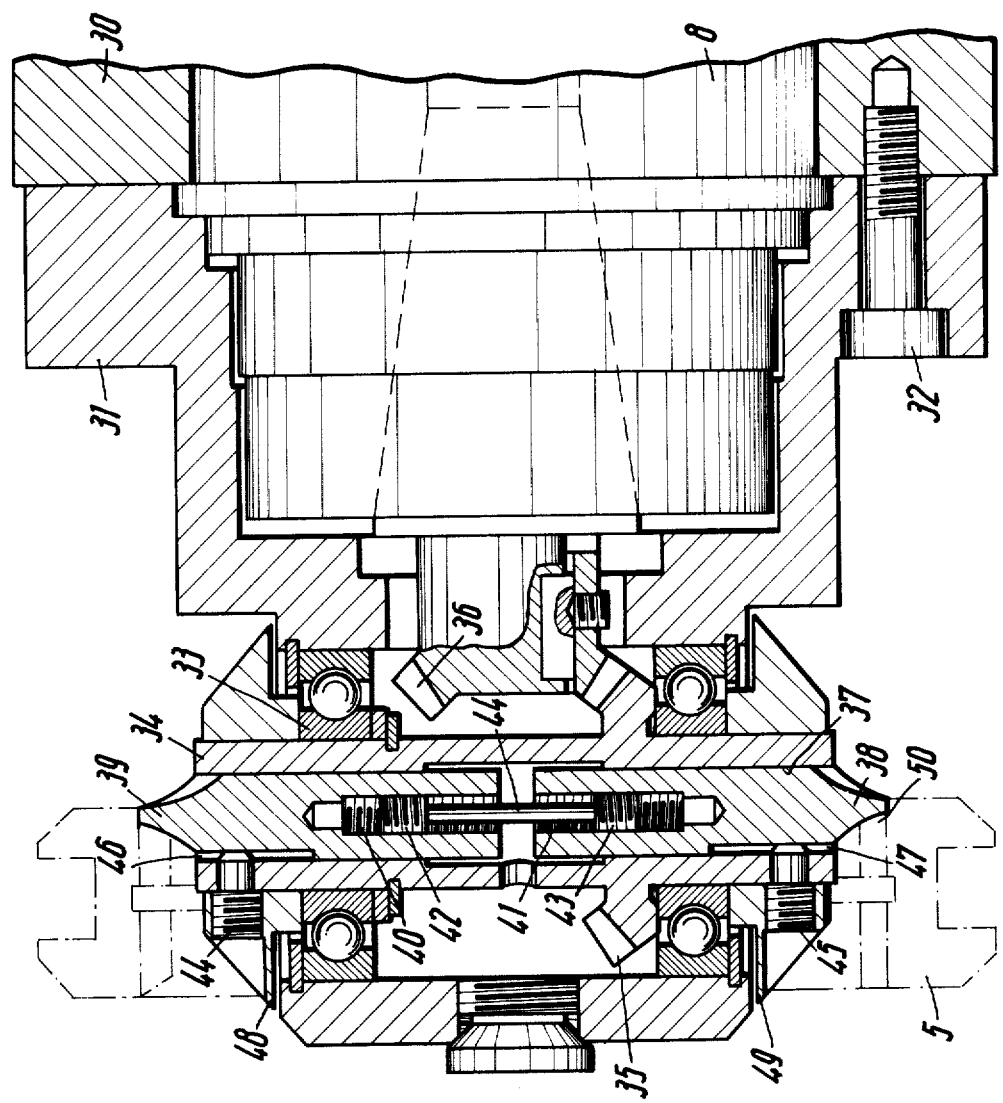
FIG. 3 illustrates an embodiment of the invention having bevel gearing.

A tool headstock 7 is also supported on the machine frame, which headstock has means for axial adjustment and for controlling the rotary movement of the tool spindle 8 (FIGS. 2 and 3). The motor 7' for driving the tool is arranged above the headstock and is connected with the headstock by means of a gearing 7'' which is supported by the back-end of the headstock. These means are also known. The control for the chamfer movement may, instead of being associated with the workpiece headstock, be associated with the tool headstock.

FIG. 2 illustrates an exemplary embodiment of the invention for the case where the axis of rotation of the tool spindle 8 is arranged perpendicularly to the axis of rotation of the workpiece spindle or the workpiece 5, as for example illustrated in FIG. 1. A gear housing 10 of a device according to the invention is secured on the housing 9 in a suitable manner, for example by screws (not illustrated). Perpendicularly to the axis of rotation of the tool spindle, the gear housing can be provided with a pilot 11 which serves to center the gear housing in the workpiece spindle or in the workpiece. A sleeve 14 is supported rotatably in the gear housing by means of bearings 12, 13. The sleeve is provided with spur gear teeth 15 (straight or advantageously helical). A gear 16 is secured on the tool spindle, which gear meshes with the spur gear teeth 15.

An opening 17 is provided in and coaxial with the sleeve 14 to receive two fingerlike cutting tools 18, 19 which with their blades project beyond both respective ends of the sleeve. The profile of the blades corresponds to the chamfer desired on the workpiece tooth. The tools are each provided on the side remote from the blades with one taphole 20, 21. A threaded pin 22 which has a thread on both ends fits into the tapholes which thus face one another. With said threaded pin it is possible to adjust accurately the axial spacing between the two tools, which for example corresponds to the dedendum circle of the teeth of the workpiece. When the spacing is adjusted, then the threaded pin is fixed with two lock nuts 23. The spacing of the blades is advantageously adjusted by a template or according to the workpiece. The tool pair is thereafter moved into the bore of the sleeve and, for example, centered by a template. The tool pair is thereafter fixed in the sleeve by studs 24, 25 for which grooves 26, 27 are provided in the tools.

For the cutting movement of the tools (movement about the axis of rotation), the sleeve 14 is driven from the tool spindle 8 by the gear 16 and the teeth 15. For the actual chamfering of the teeth of the internal gear 6, the spindle of the workpiece headstock carries out together with the workpiece 5 a rotary movement and a reciprocal movement in the direction of the workpiece spindle. For the drive of the rotary movement a not-illustrated motor with suitable gearing may be provided, while the reciprocal movement can be effected by rotating cam disk or crank means.

While in the afore-described example the workpiece axis is positioned perpendicularly to the axis of the tool spindle, in the exemplary embodiment according to FIG. 3 the axes of the workpiece spindle 8 and the axes of the tool spindle, and of the workpiece 5, are positioned coaxially. A gear housing 31 is secured on the housing 30 of the tool headstock by means of screws 32. A sleeve 34 is rotatably supported in the gear housing by bearings 33. The sleeve is provided with bevel gear teeth 35 with which a bevel gear 36 mates, said latter being secured on or in the tool spindle 8. For this purpose a receiving cone is advantageously provided. The sleeve 34 is provided with an opening 37 which lies in and coaxial with the axis of rotation of the sleeve.

The socket receives two fingerlike cutting tools 38, 39 which project with their blades from the sleeve at both ends thereof. The profile of the tool blades corresponds to the desired chamfer on the face of the workpiece teeth. The tools are provided on the ends remote from the blades, each with one central taphole 40, 41 into which cap screw 42, 43 is inserted. A spacer pin 44 can be supported against the cap screws. The distance between the tools can be adjusted by the cap screws and the spacer pin, which distance corresponds for example to the dedendum circle of the workpiece teeth. The distance can be adjusted outside of the sleeve by means of a template or according to the workpiece. When the distance is determined, the tools are introduced into the socket 37. The correct position of the axis of the workpiece spindle or of the workpiece axis is advantageously also adjusted by means of a template. The tools are fixed in the sleeve by studs 44, 45 which are provided in two closures 48, 49 which cover the sleeve at both respective ends thereof, and which closures are secured axially nonmovably and fixed with respect to rotation on the sleeve.

Grooves 46, 47 are provided in the tools for the rotational safety, into which grooves the studs engage. The cutting movement about the axis of rotation of the tools is effected by a motor 7′ through gearing 7″ and through the tool spindle 8 and the bevel gearing 35, 36. To chamfer the faces of the teeth 50, the workpiece spindle is rotated by a motor (not illustrated in detail) through not-illustrated gearing. At the same time the workpiece spindle is reciprocated in a suitably timed manner. To control this longitudinal movement a rotating cam or the like can be provided.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a device for chamfering the free ends of internal teeth in an annual toothed member comprising:

a sleeve, means for supporting and driving said sleeve about its longitudinal axis, two fingerlike cutting tools, each of said tools being secured in said sleeve for rotation therewith, and each of said tools being arranged coaxially with the longitudinal axis of the sleeve and projecting from each end of the sleeve so that said tools are spaced an equal distance from the axis of said annular toothed member, adjustment means associated with said two tools to permit an axial movement of each of said tools relative to said sleeve to vary the axial distance between them, whereby the cutting tools can be adjusted to the appropriate size and rotatingly received between the face ends of said teeth on said toothed member for chamfering same.

2. The improved device according to claim 1, wherein said sleeve is driven through spur gearing.

3. The improved device according to claim 1, wherein said sleeve is driven through an angular drive.

4. The improved device according to claim 1, wherein said adjustment means includes means for effecting a simultaneous movement of said two tools.

5. The improved device according to claim 4, wherein said means for effecting a simultaneous movement of said two tools comprises a threaded pin having threads on both ends thereof; and wherein said two tools have threaded openings therein, said threaded openings being adapted to receive said threaded pin therein so that a rotation of said threaded pin will effect said axial movement of said two tools.

6. The improved device according to claim 3, wherein said angular drive is bevel gearing.

* * * * *